Jan. 4, 1949.　　　J. G. JACKSON　　　2,457,901
REEL SIGNAL UNIT
Filed Nov. 24, 1947

INVENTOR
JAMES GORDON JACKSON
BY
Fetherstonhaugh & Co.
ATTORNEYS

Patented Jan. 4, 1949

2,457,901

UNITED STATES PATENT OFFICE 2,457,901

REEL SIGNAL UNIT

James Gordon Jackson, Port Alberni, British Columbia, Canada, assignor of one-half to James Nelson Trumpour, New Westminster, Canada Application November 24, 1947, Serial No. 787,733

8 Claims. (Cl. 116—67)

This invention relates to a signal unit for the reels of moving picture projectors.

It is necessary to have a signal given just before the end of a reel is reached in order that the moving picture projector operator will have time to get a second projector into operation.

An object of the present invention is a provision of a complete, compact unit which will give a signal at a predetermined time before the end of a reel is reached.

Another object is the provision of a reel signal unit which is completely automatic in operation and does not require any attention whatsoever.

Another object is the provision of a reel signal unit which is always ready for operation and does not need to be reset after having given the required signal.

A further object is the provision of the device of the type described which may easily be adjusted for smooth and correct operation, and which may readily be fitted to any type of moving picture projector.

With the above and other objects in view, the present invention consists essentially of an audible signal unit for motion picture projector reels comprising a carrier adapted to be mounted on the end of a reel shaft and rotatable therewith, a pendulum pivotally mounted on the carrier eccentrically of the shaft, a weight on the lower portion of the pendulum, signal means supported by the carrier, and means for operating the signal means when the pendulum starts to swing at a predetermined speed of the reel shaft, as more fully described in the following specification and illustrated in the accompanying drawings, in which:

Figure 1:
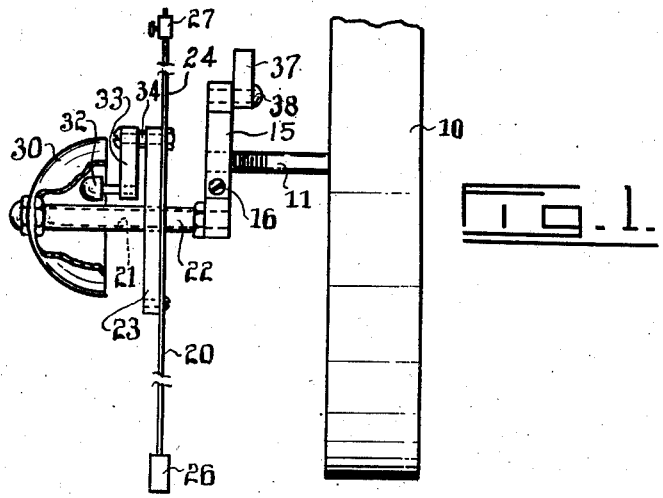
Figure 1 is a side elevation of the reel signal unit.
Figures 2, 3:
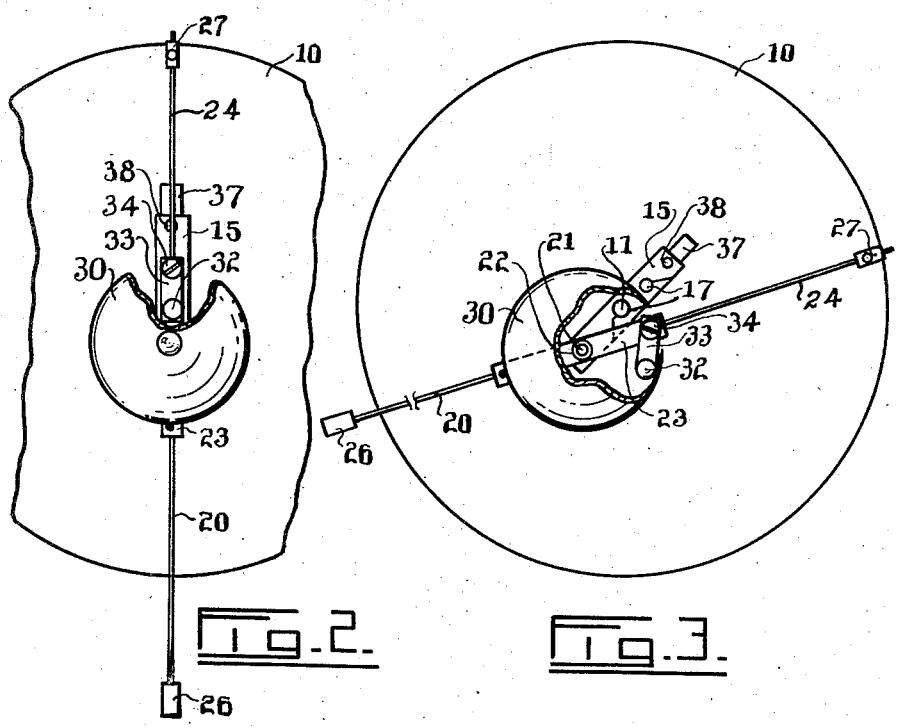
Figure 2 is a front elevation of the unit.
Figure 3 is the front elevation showing the signal in operation.

Referring more particularly to the drawings, 10 represents the reel housing of a moving picture projector from which the reel shaft 11 extends. The reel signal unit is adapted to be mounted on the end of the reel shaft in any suitable manner.

A carrier 15 is adapted to be removably mounted on the end of the reel shaft 11 in any convenient manner. The carrier illustrated in the drawings is in the form of a bracket which may be fitted on the reel shaft and tightened thereon by means of a set screw 16 so that the carrier rotates with the shaft. This carrier may be formed with one or more holes 17 for receiving the reel shaft, the hole used being dependent upon the type and size of projector with which the device is used.

A pendulum 20 is pivotally mounted on the carrier 15 eccentrically of the reel shaft. One way of doing this is to provide the carrier with a stub shaft 21 projecting outwardly therefrom eccentrically of the reel shaft. A bearing sleeve 22 may be rotatably mounted on the stub shaft. For convenience, the pendulum 20 may have a block 23 secured thereto which is fixedly mounted substantially midway between its ends upon the bearing sleeve. The pendulum is secured to the block and preferably projects upwardly above its pivot point or the stub shaft 21, as at 24. A weight 26 is mounted on the lower portion of the pendulum, while a counterbalance 27 is mounted on the upper part thereof, said counterbalance preferably being adjustable on the pendulum.

Suitable signal means is supported by the carrier 15 adjacent the pendulum. This signal means may be in the form of a bell 30 fixedly mounted on the outer end of the stub shaft 21. The pendulum is provided with suitable means for operating the signal means under certain circumstances. In this example, a hammer 32 is mounted on the lower end of an arm 33 which, in turn, is pivotally mounted at 34 on the pendulum or its block 23 near the top of the latter. The arm 33 normally hangs downwardly and the hammer projects inside the bell.

A counterbalance 37 is mounted on the carrier diametrically opposite the pendulum pivot. This counterbalance may be in the form of a weight which is secured at one edge thereof by a screw 38 to the carrier. This device counterbalances the weight of the stub shaft and its associated elements, and it may be adjusted by loosening the screw 38 and moving the outer end of the counterbalance towards or away from the reel shaft.

In operation, the carrier 15 rotates with the reel shaft 11. This causes the stub shaft 21 to move along an annular path. Normally during this movement, the weight 26 maintains the pendulum substantially in a vertical position. However, as the film continues to be drawn off the reel, the speed of rotation of the reel shaft increases. As this takes place the pendulum starts to swing back and forth slightly. When the reel shaft attains a frequency of rotation equal to the natural frequency of the pendulum, the latter swings freely at its pivot point. This causes the hammer 32 to strike the bell twice during each rotation of the reel shaft. This will continue for a few seconds until the rotation of the reel shaft is above the natural frequency of the pendulum.

The signal unit is set so that the frequency of the pendulum is reached at a predetermined time before the reel runs out. The timing of the pendulum may be adjusted by moving the counterbalance 27 up or down on the upper portion thereof.

This signal unit is always ready for operation, and all that is required, to sound the signal, is for the reel shaft to attain the desired speed of rotation. It is obvious that this unit may be attached to the reel shaft of any moving picture projector and that it does not require any skill to install it. Once it has been used, it is a very simple matter to move the counterbalance 27 to the point where the signal will be given the desired time before the end of the reel is reached.

What I claim as my invention is:

1. An audible signal unit for motion picture projector reels comprising a carrier adapted to be mounted on the end of a reel shaft and rotatable therewith, a pendulum pivotally mounted on the carrier eccentrically of the shaft, a weight on the lower portion of the pendulum, signal means supported by the carrier, and means for operating the signal means when the pendulum starts to swing at a predetermined speed of the reel shaft.

2. An audible signal unit for motion picture projector reels comprising a carrier adapted to be mounted on the end of a reel shaft and rotatable therewith, a pendulum pivotally mounted on the carrier eccentrically of the shaft, a weight on the lower portion of the pendulum, said pendulum extending above its pivot point, a counterbalance adjustably mounted on the upper part of the pendulum, signal means supported by the carrier, and means for operating the signal means when the pendulum starts to swing at a predetermined speed of the reel shaft.

3. An audible signal unit for motion picture projector reels comprising a carrier adapted to be mounted on the end of a reel shaft and rotatable therewith, a pendulum pivotally mounted on the carrier eccentrically of the shaft, a weight on the lower portion of the pendulum, said pendulum extending above its pivot point, a counterbalance mounted on the upper part of the pendulum, a counterbalance on the carrier diametrically opposite the pendulum pivot, signal means supported by the carrier, and means for operating the signal means when the pendulum starts to swing at a predetermined speed of the reel shaft.

4. An audible signal unit for motion picture projector reels comprising a carrier adapted to be mounted on the end of a reel shaft and rotatable therewith, a stub shaft projecting outwardly from the carrier eccentrically of the reel shaft, a pendulum pivotally mounted on the stub shaft, a weight on the lower portion of the pendulum, signal means carried by the stub shaft, and means for operating the signal means when the pendulum starts to swing at a predetermined speed of the reel shaft.

5. An audible signal unit for motion picture projector reels comprising a carrier adapted to be mounted on the end of a reel shaft and rotatable therewith, a stub shaft projecting outwardly from the carrier eccentrically of the reel shaft, a pendulum pivotally mounted on the stub shaft, a weight on the lower portion of the pendulum, a bell carried by the stub shaft, and a hammer on the pendulum for striking the bell when the pendulum starts to swing at a predetermined speed of the reel shaft.

6. An audible signal unit for motion picture projector reels comprising a carrier adapted to be mounted on the end of a reel shaft and rotatable therewith, a stub shaft projecting outwardly from the carrier eccentrically of the reel shaft, a pendulum pivotally mounted on the stub shaft, a weight on the lower portion of the pendulum, said pendulum extending above the stub shaft, a counterbalance adjustably mounted on the upper part of the pendulum, signal means carried by the stub shaft, and means for operating the signal means when the pendulum starts to swing at a predetermined speed of the reel shaft.

7. An audible signal unit for motion picture projector reels comprising a carrier adapted to be mounted on the end of a reel shaft and rotatable therewith, a stub shaft projecting outwardly from the carrier eccentrically of the reel shaft, a pendulum pivotally mounted on the stub shaft, a weight on the lower portion of the pendulum, said pendulum extending above the stub shaft, a counterbalance adjustably mounted on the upper part of the pendulum, a counterbalance adjustably mounted on the carrier diametrically opposite the stub shaft, signal means carried by the stub shaft, and means for operating the signal means when the pendulum starts to swing at a predetermined speed of the reel shaft.

8. An audible signal unit for motion picture projector reels comprising a carrier adapted to be mounted on the end of a reel shaft and rotatable therewith, a stub shaft projecting outwardly from the carrier eccentrically of the reel shaft, a pendulum pivotally mounted on the stub shaft, a weight on the lower portion of the pendulum, said pendulum extending above the stub shaft, a counterbalance adjustably mounted on the upper part of the pendulum, a counterbalance adjustably mounted on the carrier diametrically opposite the stub shaft, a bell carried by the stub shaft, and a hammer on the pendulum for striking the bell when the pendulum starts to swing at a predetermined speed of the reel shaft.

JAMES GORDON JACKSON.

No references cited.